UNITED STATES PATENT OFFICE.

EDGAR VON BOYEN, OF HAMBURG-STEINWÄRDER, GERMANY.

PROCESS OF MANUFACTURING MINERAL WAX.

SPECIFICATION forming part of Letters Patent No. 689,381, dated December 24, 1901.

Application filed April 30, 1900. Serial No. 14,997. (Specimens.)

*To all whom it may concern:*

Be it known that I, EDGAR VON BOYEN, residing at Hamburg-Steinwärder, in the Empire of Germany, have invented certain new and useful Improvements in Processes for the Manufacture of Mineral Wax from Bituminous Brown Coal or Lignite, (for which I have applied for patents in England, No. 5,999, dated March 30, 1900; in France, No. 286,974, dated March 30, 1900; in Austria, dated October 12, 1899, and in Germany, dated October 9, 1899,) of which the following is a specification.

My present process relates to the treatment of the bituminous brown coal at present used for producing paraffin and mineral oil, in order to produce mineral wax, which is a substance of greater value than the substances hitherto produced. According to my invention an extract is obtained (equal to about seven to ten per cent. of the primary substance) by treating the coal with hot benzin, benzene, or like mineral oil, and this extract is then converted into the mineral wax by being distilled one or more times with superheated steam in a vacuum.

In carrying out my invention I pulverize bituminous coal—that is to say, coal containing a high percentage of substances soluble in benzin—so that it will pass through a screen of 25-4 meshes to the square centimeter. This pulverized mass is dried at about 100° centigrade until it only contains 15-20 per cent. of moisture. Through the mass so dried hot benzin, (specific gravity 0.66-0.69,) benzene, or similar mineral oil is allowed to permeate until the desired extract is entirely dissolved, which will be evident by the benzin or other oil passing off from the mass in a clear colorless condition. Any benzin remaining in the mass is driven off by raising the latter to 120° centigrade by the indirect application of steam. If benzene is used, a temperature of 90° centigrade will suffice. The product thus obtained is when cold a bright brown-black hard substance, devoid of smell and having a melting-point between 80° to 90° centigrade. This mass is now heated to about 300° centigrade in a still provided with an exhausting attachment, and steam of about the same temperature is let into the mass, while the pressure is kept as low as possible by the exhausting attachment. The distillation commences at about 300° centigrade, yielding a yellow wax-like crystalline body, having a melting-point between 60° to 70° centigrade, which is the mineral wax in an impure condition. The distillation is continued until the residue is coked. Usually a single distillation will suffice, and it is only when non-decomposed extract is carried over from the still, so that the product contains too many dark-colored impurities, that it becomes necessary to repeat the distillation. At a pressure of ten millimeters of mercury the mineral wax can be distilled in a completely-undecomposed condition.

In order to obtain completely-colorless wax from the yellow wax-like body now obtained, the latter is mixed in a molten condition with about ten per cent. of mineral oil or with similar organic solvents and then allowed to harden in the form of plates. These flat cakes are subjected to pressure in hydraulic presses, and the mineral oil, together with the yellow coloring-matter, is thus pressed out. The discoloring substances still remaining in the wax can be removed by animal charcoal or similar discoloring substance.

The purified mineral wax is a white hard crystalline substance having a melting-point of 70° centigrade or even higher, which, unlike paraffin, is easily saponified by alkali and completely carbonized by concentrated sulfuric acid. The wax consists of two quite different substances—namely, an acid and an unsaturated hydrocarbon. These constituent parts can be separated by alkaline saponification in an alcoholic solution, the acid forming a potassium or sodium salt soluble in water and easily crystallized from alcohol, while the hydrocarbon, which is only difficulty soluble in alcohol containing water, is separated. The mineral acid obtained from the potassium salt by precipitation with sulfuric acid or other mineral acid melts, after repeated crystallization from organic solvents, at 80° centigrade invariably, is soluble in benzin, benzene, glacial acetic acid, ether, and alcohol, solidifies after being melted with a streaky crystalline appearance, and has a specific gravity of 0.915.

The second constituent of the mineral wax, the unsaturated hydrocarbon, is easily soluble in benzin and benzene, difficultly soluble in glacial acetic acid, alcohol, and ether, and crystallizes into bright white scales, melting at 60° centigrade and having a specific gravity of 0.92. This hydrocarbon is also, unlike paraffin, carbonized by concentrated sulfuric acid.

The combination of the two substances (mineral wax) is a valuable product for many industrial branches and especially for the manufacture of candles.

The duration of the extracting process with the benzin or other oil depends on the kind of coal used and particularly on the percentage of extract it contains. In every case the duration can be ascertained with the assistance of a sample. In other respects the process is the same with all kinds of coal.

What I claim, and desire to secure by Letters Patent of the United States, is—

1. A process for producing, from bituminous brown coal, a wax-like substance, consisting of an acid and an unsaturated hydrocarbon, according to which an extract is first obtained from the coal by means of suitable solvents such as benzin, benzene and the like, which extract is converted into the mineral wax by distillation with superheated steam, under rarefaction, substantially as described.

2. A product obtained from bituminous coals, which contains a saturated fatty acid, and which is white, crystalline, having a melting-point of about 70° centigrade, partly saponifiable by an alkali and capable of being completely carbonized by concentrated sulfuric acid.

In testimony whereof I have hereunto set my hand in the presence of two witnesses.

EDGAR VON BOYEN.

Witnesses:
GUSTAV WALISH,
E. H. L. MUMMENHOFF.